(12) United States Patent
Nakamura et al.

(10) Patent No.: US 6,172,160 B1
(45) Date of Patent: Jan. 9, 2001

(54) DIENE POLYMER COMPOSITION, PROCESS FOR THE PREPARATION OF THE SAME, AND RUBBER COMPOSITION CONTAINING THE SAME

(75) Inventors: Masao Nakamura; Yukio Takagishi, both of Kawasaki (JP)

(73) Assignee: Nippon Zeon Co., Ltd., Tokyo (JP)

( * ) Notice: Under 35 U.S.C. 154(b), the term of this patent shall be extended for 0 days.

(21) Appl. No.: 09/147,135

(22) PCT Filed: Apr. 17, 1997

(86) PCT No.: PCT/JP97/01332

§ 371 Date: Oct. 15, 1998

§ 102(e) Date: Oct. 15, 1998

(87) PCT Pub. No.: WO97/39056

PCT Pub. Date: Oct. 23, 1997

(30) Foreign Application Priority Data

Apr. 17, 1996 (JP) .................................................... 8-119688

(51) Int. Cl.[7] .............................. C08F 8/00; C08L 27/04; C08L 33/14

(52) U.S. Cl. ..................... 525/192; 525/195; 525/196; 525/213; 525/232; 525/235; 525/236; 525/237

(58) Field of Search ..................................... 525/192, 195, 525/196, 197, 213, 215, 232, 235, 236, 237

(56) References Cited

U.S. PATENT DOCUMENTS

| 4,429,091 | 1/1984 | Hall . |
| 4,894,409 | 1/1990 | Shimada et al. . |
| 5,089,554 | 2/1992 | Bomo et al. . |

FOREIGN PATENT DOCUMENTS

| 56-17362 | 2/1981 | (JP) . |
| 56-143209 | 7/1981 | (JP) . |
| 57-55912 | 4/1982 | (JP) . |
| 58-189203 | 4/1983 | (JP) . |
| 58-162604 | 9/1983 | (JP) . |
| 58-162605 | 9/1983 | (JP) . |
| 61-42552 | 3/1984 | (JP) . |
| 59-140211 | 8/1984 | (JP) . |
| 59-191705 | 10/1984 | (JP) . |
| 60-137913 | 7/1985 | (JP) . |
| 62-62838 | 3/1987 | (JP) . |
| 62-86074 | 4/1987 | (JP) . |
| 62-109801 | 5/1987 | (JP) . |
| 62-149708 | 7/1987 | (JP) . |
| 63-297403 | 5/1988 | (JP) . |
| 63-64444 | 12/1988 | (JP) . |
| 64-22940 | 1/1989 | (JP) . |
| 1-101344 | 4/1989 | (JP) . |
| 1-188501 | 7/1989 | (JP) . |
| 5-30841 | 5/1993 | (JP) . |
| 5-230286 | 9/1993 | (JP) . |
| 5-230290 | 9/1993 | (JP) . |
| 6-18932 | 3/1994 | (JP) . |
| 6-65418 | 3/1994 | (JP) . |
| 6-248116 | 9/1994 | (JP) . |
| 7-74245 | 8/1995 | (JP) . |

*Primary Examiner*—Nathan M. Nutter
(74) *Attorney, Agent, or Firm*—Armstrong, Westerman, Hattori, McCleland & Naughton

(57) ABSTRACT

The invention provides a diene polymer composition composed of a branched diene polymer component (A) having at least three branched diene polymer chains through a polyfunctional coupling agent and a linear diene polymer component (B) having a quaternary ammonium group, and having a weight average molecular weight (Mw) within a range of from 100,000 to 2,000,000, a preparation process of the diene polymer composition, and a rubber composition comprising a rubber component containing the diene polymer composition, and a reinforcing agent.

20 Claims, No Drawings

DIENE POLYMER COMPOSITION, PROCESS FOR THE PREPARATION OF THE SAME, AND RUBBER COMPOSITION CONTAINING THE SAME

TECHNICAL FIELD

The present invention relates to diene polymer compositions which exhibit excellent heat build-up resistance, and also have excellent tensile strength, abrasion resistance and processability when silica is compounded as a reinforcing agent thereinto, and a production process thereof. The present invention also relates to rubber compositions having excellent heat build-up resistance, tensile strength, abrasion properties and processability.

BACKGROUND ART

As much importance has been attached to saving in resources and countermeasures to environment in recent years, requirements to reduce fuel consumption of automobiles have been increasingly severe. Automobile tires have also been required to lower their rolling resistance so as to contribute to reduction in the fuel consumption. In order to lower the rolling resistance of tires, it is generally effective to use a rubber material capable of providing vulcanized rubber having low heat build-up as a rubber material for the tires.

In general, rubber compositions in which carbon black is compounded into a diene rubber such as natural rubber (NR), polybutadiene (BR), polyisoprene (IR) or styrene-butadiene copolymer rubber (SBR) are widely used as rubber materials for tires. However, the rubber compositions obtained by compounding carbon black into the diene rubber have insufficient heat build-up resistance.

It has heretofore been proposed to use, as a rubber material for tires, a rubber composition with silica compounded in place of carbon black as a reinforcing agent into a diene rubber so as to reduce heat build-up. However, the silica-compounded rubber composition has involved a problem that its abrasion resistance and tensile strength are insufficient compared with the carbon black-compounded rubber composition. A cause for this problem is considered to be attributed to the fact that the affinity of the silica for the diene rubber is lower than that of the carbon black, so that a reinforcing effect cannot be sufficiently developed.

In order to enhance the affinity of the silica for the diene rubber, it has heretofore been investigated to use a diene rubber with a substituent group having high affinity for silica introduced therein. For example, a diene rubber with a tertiary amino group introduced therein has been proposed for a diene rubber according to an emulsion polymerization process (Japanese Patent Application Laid-Open No. 101344/1989). Besides, a diene rubber with a substituent group such as an alkylsilyl group (Japanese Patent Application Laid-Open No. 188501/1989), a halogenated silyl group (Japanese Patent Application Laid-Open No. 230286/1993) or a substituted amino group (Japanese Patent Application Laid-Open No. 22940/1989) introduced therein has been proposed for a diene rubber according to an anionic polymerization process.

However, many of the diene rubbers with these substituent groups introduced therein have demerits that their processability is poor upon blending with silica, and their properties such as heat build-up resistance, tensile strength and abrasion resistance are not sufficiently improved.

DISCLOSURE OF THE INVENTION

It is an object of the present invention to provide a diene polymer composition which is excellent in heat build-up resistance, which is taken as an index to rolling resistance, and exhibits excellent tensile strength, abrasion resistance and processability, and a production process thereof.

Another object of the present invention is to provide a rubber composition which comprises a diene rubber containing the diene polymer composition having such excellent properties as described above, and a reinforcing agent, and has excellent heat build-up resistance, tensile strength, abrasion resistance and processability.

The present inventors have carried out an extensive investigation with a view toward overcoming the above-described problems involved in the prior art. As a result, it has been found that when a diene polymer composition containing (1) a branched diene polymer component having at least three branched diene polymer chains through a polyfunctional coupling agent and (2) a linear diene polymer component having a quaternary ammonium group is used as a rubber component compounded with silica, a rubber composition excellent in all the properties of heat build-up resistance, tensile strength, abrasion resistance and processability can be provided. The diene polymer composition can be easily obtained by allowing an active metal-bonded diene polymer obtained by using an active organometallic compound as an initiator to react with a polyfunctional coupling agent and a modifying agent capable of introducing a tertiary amino group, and then allowing an alkylating agent to react with a formed product to convert the tertiary amino group into a quaternary ammonium group. The present invention has been led to completion on the basis of these findings.

According to the present invention, there is thus provided a diene polymer composition composed of a branched diene polymer component (A) having at least three branched diene polymer chains through a polyfunctional coupling agent and a linear diene polymer component (B) having a quaternary ammonium group, and having a weight average molecular weight (Mw) within a range of from 100,000 to 2,000,000.

According to the present invention, there is also provided a process for producing a diene polymer composition having a weight average molecular weight (Mw) within a range of from 100,000 to 2,000,000, the process comprising (1) allowing an active diene polymer with an active metal bonded to its molecular chain to react with a coupling agent which is trifunctional or polyfunctional to a degree higher than three and a modifying agent capable of introducing a tertiary amino group into the polymer chain by reacting with the active metal to form a branched diene polymer component (A) having at least three branched diene polymer chains through the coupling agent and a linear diene polymer component with the tertiary ammonium group introduced therein, and then (2) allowing an alkylating agent to react with the linear diene polymer component to convert the tertiary amino group into a quaternary ammonium group, thereby forming a linear diene polymer component (B) having the quaternary ammonium group.

According to the present invention, there is further provided a rubber composition comprising a rubber component containing a diene polymer composition which is composed of a branched diene polymer component (A) having at least three branched diene polymer chains through a polyfunctional coupling agent and a linear diene polymer component (B) having a quaternary ammonium group, and has a weight average molecular weight (Mw) within a range of from 100,000 to 2,000,000, and a reinforcing agent.

BEST MODE FOR CARRYING OUT THE INVENTION

Diene Polymer Composition:

The feature of the diene polymer composition according to the present invention resides in that it is composed of a branched diene polymer component (A) having at least three branched diene polymer chains through a polyfunctional coupling agent and a linear diene polymer component (B) having a quaternary ammonium group.

No particular limitation is imposed on the branched diene polymer component so far as it has a structure that at least three branched diene polymer chains are contained through a polyfunctional coupling agent. For example, a polymer component represented by the following formula (1):

$$(P^1)_m Y^1 \quad (1)$$

wherein $P^1$ is a diene polymer chain, m is an integer of 3 or greater, and $Y^1$ is a residue of a polyfunctional coupling agent, is used.

$P^1$ in the formula (1) denotes a diene polymer chain (a), and specific examples thereof include polymer chains of a conjugated diene, and copolymer chains of a conjugated diene and another monomer which is copolymerizable with the conjugated diene.

Examples of the conjugated diene include 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferred, with 1,3-butadiene being particularly preferred. These conjugated dienes may be used either singly or in any combination thereof. The content of the conjugated diene monomer units in the diene polymer chain (a) is suitably selected as necessary for the end application intended. However, it is generally within a range of from 40 to 100 wt. %, preferably from 50 to 100 wt. %, more preferably 55 to 100 wt. %.

Said other monomer is suitably selected from among those generally used as copolymerizable components with the conjugated diene in the field of rubber materials for tires. However, aromatic vinyls are particularly preferably used from the viewpoint of well balancing among various properties such as heat build-up and wet skid resistance. Examples of the aromatic vinyls include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is particularly preferred. The copolymerizable monomers may be used either singly or in any combination thereof.

The kind of said other monomer and whether units of said monomer are allowed to exist in the diene polymer chain (a) or not are suitably selected as necessary for the end application intended. For example, when much importance is attached to heat build-up resistance, a conjugated diene polymer is generally used. On the other hand, when heat build-up resistance is well balanced with wet skid resistance, a copolymer of the conjugated diene and said other monomer (preferably an aromatic vinyl) is used. In such a case, the contents of the respective monomer units are as follows. The content of the conjugated diene monomer units is generally within a range of from 40 to 95 wt. %, preferably from 50 to 90 wt. %, more preferably from 55 to 85 wt. %, while the content of said other monomer units (preferably the aromatic vinyl monomer units) is generally within a range of from 60 to 5 wt. %, preferably from 50 to 10 wt. %, more preferably from 45 to 15 wt. %. If the content of said other monomer units is too high, the heat build-up resistance of the resulting diene polymer composition becomes insufficient. Therefore, such a too high content of said other monomer units is not preferred.

m in the formula (1) denotes an integer of 3 or greater, and is generally an integer of 3 to 8, preferably an integer of 3 to 6, more preferably 3 or 4.

No particular limitation is imposed on the polyfunctional coupling agent so far as it is a coupling agent generally used in the field of rubber materials and having trifunctionality or polyfunctionality to a degree higher than three. Specific examples of the polyfunctional coupling agent will be mentioned subsequently.

The linear diene polymer component features that it has a quaternary ammonium group. For example, a polymer component represented by the following formula (2):

$$P^2-Y^2 \quad (2)$$

wherein $P^2$ is a diene polymer chain, and $Y^2$ is a quaternary ammonium group, is used.

$P^2$ in the formula (2) denotes a diene polymer chain (b), and the same diene polymer chain as the diene polymer chain (a) of $P^1$ is generally used.

$Y^2$ in the formula (2) denotes a quaternary ammonium group and is represented by, for example, the following formula (3):

$$—A—\underset{\underset{R^2}{|}}{\overset{\overset{R^1}{|}}{N^+}}—R^3 \cdot X^- \quad (3)$$

wherein $R^1$, $R^2$ and $R^3$ are independently an alkyl or aryl group, A is an alkylene or arylene group, and X is a halogen atom, with the proviso that $R^1$ or $R^2$ and A may be bonded to each other to form a heterocyclic ring.

$R^1$, $R^2$ and $R^3$ in the formula (3) independently denote an alkyl or aryl group, and each is preferably an alkyl group. Examples of the alkyl group include methyl, ethyl, propyl, isoporopyl, n-butyl, sec-butyl, tert-butyl, n-pentyl, isopentyl, n-hexyl, n-octyl and n-decyl groups. Of these, lower alkyl groups having 1 to 6 carbon atoms, such as methyl, ethyl, propyl, isopropyl, n-butyl, sec-butyl, tert-butyl, n-pentyl, isopentyl and n-hexyl groups, are preferred. The methyl, ethyl, propyl and butyl groups are more preferred, with the methyl and ethyl groups being particularly preferred. The hydrogen atoms of the alkyl group may be partially substituted by an aryl, alkoxy or aryloxy group, or the like. Specific examples of the substituent group include benzyl, phenethyl, methoxyethyl, ethoxyethyl and phenoxyethyl groups. Examples of the aryl group include phenyl, naphthyl and biphenyl groups. The hydrogen atoms thereof may be partially substituted by a lower alkyl group or the like.

A in the formula (3) denotes an alkylene or arylene group. Examples of the alkylene group include methylene, ethylene, n-propylene, isopropylene, n-butylene, isobutylene, sec-butylene, tert-butylene and n-hexylene groups. The hydrogen atoms thereof may be partially substituted by an aryl, alkoxy or aryloxy group, or the like. Examples of the arylene group include 1,2-phenylene, 1,3-phenylene and 1,4-phenylene groups. The hydrogen atoms thereof may be partially substituted by a lower alkyl group.

$R^1$ or $R^2$ and A in the formula (3) may also be bonded to each other to form a heterocyclic ring. Specific examples of the heterocyclic ring include pyrrolidine, piperidine and pyridine rings.

X in the formula (3) denotes a halogen atom. More specifically, the halogen atom includes chlorine, bromine, iodine and fluorine atoms. Of these, chlorine, bromine and iodine atoms are preferred.

No particular limitation is imposed on the bonding position of the quaternary ammonium group in the diene polymer chain (b). However, it is preferred that it should be bonded to a terminal of the polymer chain, because its effect for improving heat build-up resistance is markedly exhibited.

The diene polymer composition according to the present invention is a composition containing the branched diene polymer component (A) and the linear diene polymer component (B). Proportions of both polymer components are selected as suitably necessary for the end application intended. However, the weight ratio of the polymer component (A) to the polymer component (B) is generally within a range of from 10:90 to 90:10, preferably from 20:80 to 80:20, more preferably from 30:70 to 70:30. When the proportion of the branched diene polymer component (A) to the linear diene polymer component (B) falls within this range, the resulting rubber composition is balanced among heat build-up resistance, tensile strength, abrasion resistance and processability at a high level. Therefore, the proportion within such a range is preferred.

The diene polymer composition according to the present invention can be obtained by (1) a process comprising separately preparing the branched diene polymer component (A) and the linear diene polymer component (B) and then blending both components, or (2) a process comprising allowing an active diene polymer with an active metal bonded to its molecular chain to react with a trifunctional or still higher polyfunctional coupling agent and a modifying agent capable of introducing a tertiary amino group into the polymer chain by reacting with the active metal, and then (2) allowing an alkylating agent to react, thereby preparing the polymer composition as a mixture. It goes without saying that the component (A) or the component (B) separately prepared may be blended with the diene polymer composition prepared as the mixture to adjust the compositional ratio between both components.

The molecular weight of the diene polymer composition is within a range of from 100,000 to 2,000,000, preferably from 150,000 to 1,500,000, more preferably from 200,000 to 1,200,000 in terms of the weight average molecular weight (Mw) of standard polystyrene as measured by gel permeation chromatography (GPC), provided that the weight average molecular weight is a weight average molecular weight of the respective components (A) and (B), or a mixture of both components. If the weight average molecular weight (Mw) is too low, the heat build-up resistance and abrasion resistance of the resulting rubber composition becomes poor. If the molecular weight is too high on the other hand, the processability of the resulting rubber composition becomes poor. Therefore, such a too low or high molecular weight is not preferred.

No particular limitation is imposed on the molecular weight distribution (Mw/Mn) represented by the ratio of a weight average molecular weight (Mw) to a number average molecular weight (Mn) of the diene polymer composition according to the present invention. However, it is generally within a range of from 1.1 to 3.5, preferably from 1.2 to 3, more preferably from 1.3 to 2.5, provided that the molecular weight distribution is a molecular weight distribution of the respective components (A) and (B), or a mixture of both components. When the molecular weight distribution of the diene polymer composition falls within this range, the heat build-up resistance and processability of the resulting rubber composition are balanced at a high level. Therefore, the molecular weight distribution within such a range is preferred.

No particular limitation is imposed on the vinyl bond (1,2-vinyl bond and 3,4-vinyl bond) content in conjugated diene bond portions of the diene polymer composition according to the present invention. However, the vinyl bond content is generally at least 10%, preferably within a range of from 10 to 90%, more preferably from 30 to 85%, most preferably from 50 to 80%, provided that the vinyl bond content in the conjugated diene bond portions is a vinyl bond content of conjugated diene bond portions of the respective components (A) and (B), or a mixture of both components. When the vinyl bond content in the conjugated diene bond portions of the diene polymer composition falls within this range, the resulting rubber composition is balanced among tensile strength, abrasion resistance, heat build-up resistance and processability at a high level. Therefore, the vinyl bond content within such a range is preferred. The remaining conjugated diene bond unit other than the vinyl bond is a 1,4-bond. The 1,4-bond may be either a 1,4-cis bond or a 1,4-trans bond.

The branched diene polymer component (A) and the linear diene polymer component (B) in the diene polymer composition according to the present invention are both preferably derived from a diene polymer obtained by (co)polymerizing 40 to 100 wt. % of a conjugated diene and 60 to 0 wt. % of another copolymerizable monomer. The kinds of the respective monomers and the preferable contents of the respective monomer units in the case of the copolymer are the same as those of the specific examples in the diene polymer chain (a) in the formula (1).

When the diene polymer is a copolymer of a conjugated diene and an aromatic vinyl, no particular limitation is imposed on the chain distribution of aromatic vinyl units in the copolymer. However, from the viewpoint of balancing among various properties such as heat build-up resistance, abrasion resistance and wet skid resistance at a high level, it is appropriate that the content of a simple chain of one aromatic vinyl unit should be generally at least 40 wt. %, preferably at least 60 wt. %, more preferably at least 75 wt. %, based on the whole bound aromatic vinyl content, and the content of aromatic vinyl long chains composed of at least 8 aromatic vinyl units should be at most 5 wt. %, preferably at most 2.5 wt. %, more preferably at most 1.5 wt. %, based on the whole bound aromatic vinyl content.

No particular limitation is imposed on the production process of the diene polymer composition according to the present invention. However, for example, the diene polymer composition can be obtained by allowing an active diene polymer with an active metal bonded to its molecular chain to react with a trifunctional or still higher polyfunctional coupling agent and a modifying agent capable of introducing a tertiary amino group into the polymer chain by reacting with the active metal, and then allowing an alkylating agent to react.

As the active metal to be bonded to the diene polymer, those generally known in the technical field of diene rubber may be used. Examples thereof includes active metals capable of subjecting to anionic polymerization, which are described in Japanese Patent Application Laid-Open Nos. 162604/1983 and 42552/1986, Japanese Patent Publication No. 30841/1993, and Japanese Patent Application Laid-Open No. 297403/1988. More specific examples thereof include alkali metals such as lithium, sodium, potassium, rubidium and cesium; alkaline earth metals such as beryllium, magnesium, calcium, strontium and barium; and rare earth metals of the lanthanoid series, such as lanthanum and neodymium. Of these, the alkali metals and alkaline earth metals are preferred, with the alkali metals being particularly preferred.

As the diene polymer with such an active metal bonded thereto (hereinafter referred to as the active polymer), a polymer prepared by any known method may be used. For example, (1) a polymer (hereinafter referred to as the active polymer a) obtained by adding an active metal to a diene polymer prepared by a polymerization process such as emulsion polymerization or solution polymerization by a subsequent reaction, and (2) a polymer (hereinafter referred to as the active polymer b) obtained by (co)polymerizing a conjugated diene, or a conjugated diene and another copolymerizable monomer using, as an initiator, an active organometallic compound containing any of the above-mentioned active metals, in accordance with their corresponding processes disclosed in Japanese Patent Application Laid-Open No. 189203/1983 may be used. Of these, the active polymer b is particularly preferred from the viewpoint of introducing a tertiary amino group into a terminal of the polymer chain because the active metal is bonded to the terminal of the polymer chain.

The preparation process of the active polymer b will hereinafter be described in detail.

No particular limitation is imposed on the active organometallic compound used as the initiator so far as it contains an active metal and is that generally used in anionic polymerization. Examples thereof include organic alkali metal compounds, organic alkaline earth metal compounds and organic acid salts with rare earth metals of the lanthanoid series. Of these, the organic alkali metal compounds are particularly preferred.

Examples of the organic alkali metal compounds include organic monolithium compounds such as n-butyllithium, sec-butyllithium, t-butyllithium, hexyllithium, phenyllithium and stilbene lithium; polyfunctional organic lithium compounds such as dilithiomethane, 1,4-dilithiobutane, 1,4-dilithio-2-ethylcyclohexane and 1,3,5-trilithiobenzene; and sodium naphthalene and potassium naphthalene. Of these, the organolithium compounds are preferred, with the organic monolithium compounds being particularly preferred.

Examples of the organic alkaline earth metal compounds include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

Examples of the organic acid salts with rare earth metals of the lanthanoid series include composite catalysts composed of neodymium versate/triethylaluminum hydride/ethylaluminum sesquichloride as described in Japanese Patent Publication No. 64444/1988.

These active organometallic compounds may be used either singly or in any combination thereof. The amount of the active organometallic compound used is suitably selected according to a molecular weight required of a polymer formed. However, it is generally within a range of from 0.01 to 20 millimoles, preferably from 0.05 to 15 millimoles, more preferably from 0.1 to 10 millimoles per 100 g of the whole monomer used.

The polymerization reaction using the active organometallic compound as an initiator is conducted in a hydrocarbon solvent which does not destroy the initiator. No particular limitation is imposed on a suitable hydrocarbon solvent so far as it is that used in usual solution polymerization, and examples thereof include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. Of these, n-hexane, cyclohexane and toluene are preferred. Besides, an unsaturated hydrocarbon having low polymerizability, such as 1-butene, cis-2-butene or 2-hexene, may be used as needed. These hydrocarbon solvents may be used either singly or in any combination thereof, generally, in such a proportion that the concentration of the monomers amounts to 1–30 wt. %.

In order to control the microstructure of the conjugated diene bond units or the distribution of the aromatic vinyl copolymerized with the conjugated diene in the copolymer chain upon the polymerization reaction, a polar compound may be used. No particular limitation is imposed on the polar compound so far as it is that used in usual anionic polymerization using the active organometallic compound as an initiator. Examples thereof include ethers; tertiary amines; alkali metal alkoxides such as potassium-t-amyl oxide and potassium-t-butyl oxide; and phosphines such as triphenylphosphine. Of these, the tertiary amines and ethers are preferred.

Examples of the tertiary amines include tetramethylethylenediamine, trimethylamine, triethylamine, pyridine and quinuclidine, and tetramethylethylenediamine is preferred.

The ether compounds are classified into, for example, monoether compounds having an ether bond in their molecules, diether compounds having two ether bonds in their molecules, and polyether compounds having three or more ether bonds in their molecules. The diether compounds are most preferred. No particular limitation is imposed on the number of carbon atoms in the ether compound. However, it is generally within a range of from 2 to 100, preferably from 4 to 50, more preferably from 4 to 20, most preferably from 4 to 15.

Examples of the monoether compounds include aliphatic monoethers such as dimethyl ether, diethyl ether, diisopropyl ether, dibutyl ether, diamyl ether, diisoamyl ether, methyl ethyl ether, methyl propyl ether, methyl isopropyl ether, methyl butyl ether, methyl isoamyl ether, ethyl propyl ether, ethyl isopropyl ether and ethyl butyl ether; aromatic monoethers such as anisol, phenetol, diphenyl ether and dibenzyl ether; and cyclic monoethers such as tetrahydrofuran and tetrahydropyran. Of these, the aliphatic monoethers and aromatic monoethers are preferred.

Examples of the diether compounds include alkylene glycol diethers and cyclic diethers. The alkylene glycol diethers are preferred. No particular limitation is imposed on the number of carbon atoms in the diether compound. However, it is generally within a range of from 4 to 30, preferably from 4 to 20, more preferably from 4 to 15.

Examples of the alkylene glycol diethers include alkylene glycol dialkyl ethers, alkylene glycol alkyl aryl ethers, alkylene glycol diaryl ethers and alkylene glycol diaralkyl ethers. The alkylene glycol dialkyl ethers are preferred.

Preferable examples of the alkylene glycol diethers include alkylene glycol dialkyl ethers such as ethylene glycol dimethyl ether, ethylene glycol methyl ethyl ether, ethylene glycol diethyl ether, ethylene glycol dipropyl ether, ethylene glycol dibutyl ether, ethylene glycol diamyl ether, ethylene glycol dioctyl ether, propylene glycol dimethyl ether, propylene glycol diethyl ether, propylene glycol dibutyl ether, isopropylene glycol dimethyl ether, isopropylene glycol diethyl ether, butylene glycol dimethyl ether, butylene glycol diethyl ether, butylene glycol dibutyl ether; alkylene glycol alkyl aryl ethers such as ethylene glycol methyl phenyl ether; alkylene glycol diaryl ethers such as ethylene glycol diphenyl ether; and alkylene glycol diaralkyl ethers such as ethylene glycol dibenzyl ether. Of these, ethylene glycol dimethyl ether, ethylene glycol methyl ethyl ether, ethylene glycol diethyl ether, ethylene glycol dipropyl ether, ethylene glycol dibutyl ether, ethylene glycol diamyl ether, propylene glycol dimethyl ether, propylene glycol diethyl ether are propylene glycol dibutyl ether are preferred, with ethylene glycol dimethyl ether, ethylene glycol methyl ethyl ether, ethylene glycol diethyl ether, ethylene glycol dipropyl ether, ethylene glycol dibutyl ether, ethylene glycol butyl t-butyl ether and ethylene glycol diamyl ether being particularly preferred.

Examples of the cyclic diethers include dioxane, 1,10-phenanthroline, and dioxolane alkanes described in U.S. Pat. No. 4,429,091, for example, bis(2-oxolanyl)methane, 2,2-bis(2-oxolanyl)propane, 1,1-bis(2-oxolanyl)ethane and 2,2-bis(5-methyl-2-oxolanyl)propane. Of these, dioxane and the dioxolane alkanes are preferred.

Examples of the polyether compounds having three or more oxy groups in their molecules include oligooxyalkylene glycol dialkyl ethers, oxolanyldioxanes, oxolanyldioxolanes and crown ethers.

Examples of the oligooxyalkylene glycol dialkyl ethers include oligooxyethylene glycol dialkyl ethers such as diethylene glycol dimethyl ether, diethylene glycol methyl ethyl ether, diethylene glycol diethyl ether, diethylene glycol dibutyl ether, diethylene glycol dihexyl ether, triethylene glycol dimethyl ether, triethylene glycol dipropyl ether, triethylene glycol dibutyl ether and tetraethylene glycol diethyl ether; oligooxypropylene glycol dialkyl ethers such as dipropylene glycol dimethyl ether, dipropylene glycol diethyl ether, dipropylene glycol dipropyl ether and diisopropylene glycol diamyl; and oligooxybutylene glycol dialkyl ethers such as dibutylene glycol dimethyl ether. Of these, the oligooxyethylene glycol dialkyl ethers are preferred, with diethylene glycol dimethyl ether, diethylene glycol diethyl ether, diethylene glycol dibutyl ether, triethylene glycol dimethyl ether, triethylene glycol dibutyl ether and tetraethylene glycol diethyl ether being particularly preferred.

Examples of polyoxyalkylene glycol dialkyl ethers include polyoxyethylene glycol dialkyl ethers such as polyoxyethylene glycol dimethyl ether, polyoxyethylene glycol diethyl ether, polyoxyethylene glycol diisopropyl ether, polyoxyethylene glycol dibutyl ether, polyoxyethylene glycol dioctyl ether; polyoxypropylene glycol dialkyl ethers such as polyoxypropylene glycol dimethyl ether and polyoxypropylene glycol diethyl ether; and polyoxybutylene glycol dialkyl ethers such as polyoxybutylene glycol dimethyl ether.

Examples of the oxolanyldioxanes and oxolanyldioxolanes include compounds described in Japanese Patent Publication No. 74245/1995. Specific examples thereof include 2-(2-oxolanyl)dioxane, 2-(2-oxolanyl)-4,4,6-trimethyldioxane, 2-(5-methyl-2-oxolanyl)-4,4,6-trimethyldioxane, 2-(2-oxolanyl)-5,5-dimethyldioxane, 2-(2-oxolanyl)dioxolane, 2-(2-oxolanyl)-4-t-butyloxolane, 2-(2-oxolanyl)-4,5-dimethyldioxolane and 2-(2-oxolanyl)-4,4,5,5-tetramethyldioxolane.

Examples of the crown ethers include 18-crown-6-ether, 15-crown-5-ether, 12-crown-4-ether, dibenzo-18-crown ether, dibenzo-24-crown-8-ether, dicyclohexano-18-crown-6-ether and 4'-nitrobenzo-15-crown-5-ether.

These polar compounds may be used either singly or in any combination thereof. The amount of the polar compound used is generally within a range of from 0 to 200 moles, preferably from 0.01 to 100 moles, more preferably 0.1 to 50 moles, most preferably from 0.3 to 20 moles per mole of the active organometallic compound.

The polymerization reaction is carried out by (co) polymerizing the conjugated diene, or the conjugated diene and another copolymerizable monomer (preferably, an aromatic vinyl). When the conjugated diene and another copolymerizable monomer are used in combination, the proportions of the respective monomers in the whole monomer are as follows. The proportion of the conjugated diene is generally within a range of from 40 to 95 wt. %, preferably from 50 to 90 wt. %, more preferably from 55 to 85 wt. %, while the proportion of another copolymerizable monomer (preferably, the aromatic vinyl) is generally within a range of from 60 to 5 wt. %, preferably from 50 to 10 wt. %, more preferably from 45 to 15 wt. %.

The polymerization reaction is generally conducted in a temperature range of from −78° C. to +150° C. under a polymerization style such as a batch process or a continuous process. In the case where the aromatic vinyl is copolymerized, in order to polymerize the aromatic vinyl at random, it is desirable to continuously or intermittently supply the conjugated diene or a mixture of the conjugated diene and the aromatic vinyl in the reaction system in such a manner that the aromatic vinyl content in the compositional ratio of the aromatic vinyl to the conjugated diene in the polymerization system amounts to a specific concentration range as described in, for example, Japanese Patent Application Laid-Open Nos. 140211/1984 and 143209/1981.

An active diene polymer with the active metal bonded to the terminal of its polymer chain is formed by the above-described polymerization reaction. As specific examples of the diene polymer, may be mentioned polybutadiene, polyisoprene, butadiene-isoprene copolymers, styrene-butadiene copolymers, styrene-isoprene copolymers and styrene-butadiene-isoprene terpolymers.

As examples of the coupling agent allowed to react with the active diene polymer, may be mentioned various kinds of coupling agents which are trifunctional or polyfunctional to a degree higher than three disclosed in, for example, Japanese Patent Application Laid-Open No. 143209/1981, 17362/1981, 55912/1982 and 162605/1983.

As specific examples of the polyfunctional coupling agent, may be mentioned tin type coupling agent such as tin tetrachloride, tin tetrabromide, monomethyltin trichloride, monoethyltin trichloride, monobutyltin trichloride, monohexyltin trichloride, dimethyltin dichloride, diethyltin dichloride, dibutyltin dichloride, dibutyltin dibromide, tetrmethoxytin, tetraethoxytin, tetrabutoxytin and bis(trichlorostannyl)ethane; silicon type coupling agents such as silicon tetrachloride, silicon tetrabromide, silicon tetraiodide, monomethyltrichlorosilane, monoethyltrichlorosilane, monombutyltrichlorosilane, monohexyltrichlorosilane, monomethyltribromosilane, dimethyldichlorosilane, diethyldichlorosilane, butyltrichlorosilane, dibutyldichlorosilane, dihexyldichlorosilane, dimethyldibromosilane, tetramethoxysilane, tetraethoxysilane, tetrabutoxysilane, diphenyldimethoxysilane, diphenyldiethoxysilane, monochlorotrimethoxysilane, monobromotrimethoxysilane, dichlorodimethoxysilane, dibromodimethoxysilane, trichloromethoxysilane, tribromomethoxysilane, alkyltriphenoxysilanes and bis(trichlorosilyl)ethane; halogenated metal type coupling agents such as germanium tetrachloride; halogenated hydrocarbon type coupling agents such as chloroform, tribromomethane, trichloroethane, trichloropropane, tribromopropane, carbon tetrachloride and tetrachloroethane; ester type coupling agents such as dimethyl adipate, diethyl adipate, dimethyl terephthalate, diethyl terephthalate, dimethyl phthalate and dimethyl isophthalate; and halide type coupling agents such as terephthalic acid dichloride, phthalic acid dichloride, isophthalic acid dichloride and adipic acid dichloride. Of these, the tin type coupling agents, silicon type coupling agents, ester type coupling agents and halogenated hydrocarbon type coupling agents are preferred, with the tin type coupling agents and silicon type coupling agents being particularly preferred.

These coupling agents may be used either singly or in any combination thereof. The amount of the coupling agent used is suitably selected according to the preparation process, preparation conditions or the like. For example, the amount of the coupling agent used in the case where the branched diene polymer component (A) is prepared separately is generally at least 1 equivalent, preferably within a range of from 1 to 2 equivalents, more preferably from 1 to 1.5 equivalents to the active metal in the active diene polymer. The amount of the coupling agent used in the case where the branched diene polymer component (A) and the linear diene polymer component (B) are prepared in a simultaneous or successive reaction is generally within a range of from 0.1 to 0.9 equivalents, preferably from 0.2 to 0.8 equivalents, more preferably from 0.3 to 0.7 equivalents to the active metal in the active diene polymer. By the way, when the diene polymer is that polymerized using the active organometallic compound as an initiator, an amount of the coupling agent used "to the amount of the active organometallic compound used" is determined as the amount of the coupling agent used "to the active metal in the active diene polymer".

The coupling reaction may be conducted by bringing the active diene polymer into contact with the polyfunctional coupling agent. In the case where the active diene polymer is prepared by a polymerization reaction making use of the active organometallic compound as an initiator, the modification reaction can be generally performed by adding the prescribed amount of the polyfunctional coupling agent to the reaction mixture containing the active diene polymer before termination of the polymerization. The coupling reaction is generally carried out under reaction conditions of 0 to 150° C. and 0.5 to 20 hours. The coupling rate can be determined from an area ratio of high molecular weight to low molecular weight in a differential refractometer by GPC measurement.

The modifying agent capable of introducing a tertiary amino group into the diene polymer chain by reacting with the active diene polymer is known, and various kinds of modifying agents disclosed in, for example, Japanese Patent Application Laid-Open No. 191705/1984, 137913/1985, 86074/1987, 109801/1987, 149708/1987 and 22940/1989 may be used.

Preferable examples of such modifying agents include compounds (hereinafter referred to as the modifying agents a) having a functional group capable of reacting with the active metal, and a tertiary amino group in their molecules, and compounds (hereinafter referred to as the modifying agents b) having an N-substituted nitrogen-carbon double bond in their molecules. Of these, the modifying agents a are preferred.

No particular limitation is imposed on the functional group in the modifying agent a so far as it reacts with the active metal in the active diene polymer. Examples thereof include carbon-carbon unsaturated groups such as a vinyl group, halogen atoms, and a carbonyl group.

Preferable examples of the modifying agents a include compounds having a vinyl group and a tertiary amino group in their molecules, and compounds having a carbonyl group and a tertiary amino group in their molecules.

Examples of the compounds having a vinyl group and a tertiary amino group in their molecules include N,N-disubstituted aminoalkyl acrylates, N,N-disubstituted aminoalkyl acrylamides, N,N-disubstituted amino-aromatic vinyl compounds and vinyl compounds having a pyridyl group.

Examples of the N,N-disubstituted aminoalkyl acrylates include esters of acrylic acid or methacrylic acid, such as N,N-dimethylaminomethyl (meth)acrylate, N-methyl-N-ethylaminoalkyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate and acryloylmorpholine. Of these, N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate.

Examples of the N,N-disubstituted aminoalkyl acrylamides include acrylamide compounds or methacrylamide compounds such as N,N-dimethylaminomethyl (meth)acrylamide, N-methyl-N-ethylaminomethyl (meth)acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N-dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N-dihexylaminopropyl (meth)acrylamide and N,N-dioctylaminopropyl (meth)acrylamide. Of these, N,N-dimethylaminopropyl (meth)acrylamide, N,N-diethylaminopropyl (meth)acrylamide and N,N-dioctylaminopropyl (meth)acrylamide are preferred.

Example of the N,N-disubstituted amino-aromatic vinyl compounds include styrene derivatives such as N,N-dimethylaminoethylstyrene, N-methyl-N-ethylaminoethylstyrene, N,N-diethylaminoethylstyrene, N,N-dipropylaminoethylstyrene and N,N-dioctylaminoethylstyrene.

In the compounds having a carbonyl group and a tertiary amino group in their molecules, both groups may be adjacent to or separate from each other. Example of compounds having both groups in an adjoined relation include N-substituted amides, N-substituted imides, N-substituted ureas and N-substituted isocyanuric acids. Cyclic compounds having these functional groups are preferred.

Examples of compounds having both groups in a separated relation include N-substituted aminoketones and N-substituted aminoaldehydes. The N-substituted aminoketones are preferred.

Examples of the N-substituted cyclic amides include N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-2-laurylolactam and N-vinyl-ω-laurylolactam. Of these, N-methyl-2-pyrrolidone, N-vinyl-2-pyrrolidone, N-methyl-2-piperidone, N-methyl-piperidone, N-vinyl-2-piperidone, N-methyl-ε-caprolactam and N-phenyl-ε-caprolactam are preferred.

Examples of the N-substituted cyclic ureas include 1,3-dimethylethyleneurea, 1,3-divinylethyleneurea, 1,3-diethyl-2-imidazolidinone and 1-methyl-3-ethyl-2-imidazolidinone, with 1,3-dimethylethyleneurea and 1,3-divinylethyleneurea being preferred.

Examples of the N-substituted aminoketones include 4-N,N-dimethylaminoacetophenone, 4-N-methyl-N-ethylaminoacetophenone, 4-N,N-diethylaminoacetophenone, 1,3-bis(diphenylamino)-2-propanone, 1,7-bis(methylethylamino)-4-heptanone, 4-N,N-dimethylaminobenzophenone, 4-N,N-di-t-butylaminobenzophenone, 4-N,N-diphenylaminobenzophenone, 4,4'-bis(dimethylamino) benzophenone, 4,4'-bis(diethylamino)benzophenone and 4,4'-bis(diphenylamino)benzophenone. Of these, 4,4'-bis (diethylamino)benzophenone and 4,4'-bis(diphenylamino) benzophenone are particularly preferred.

Examples of the N-substituted aminoaldehydes include N-substituted aminoaldehydes such as 4-N,N-dimethylaminobenzaldehyde, 4-N,N-diphenylaminobenzaldehyde and 4-N,N-divinylaminobenzaldehyde.

Examples of the modifying agents b, or the compounds having an N-substituted nitrogen-carbon double bond include N-substituted carbodiimides and Schiff bases.

Examples of the N-substituted carbodiimides include dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide and phenylbenzylcarbodiimide. Of these, dicyclohexylcarbodiimide and diphenylcarbodiimide are preferred.

Examples of the Schiff bases include N-ethylethylideneimine, N-methylbenzylideneimine, N-hexylcinnamylideneimine, N-decyl-2-ethyl-1,2-diphenylbutylideneimine, N-phenylbenzylideneimine, N-dodecylcyclohexaneimine, N-propyl-2,5-cyclohexadieneimine and N-methyl-1-naphthaleneimine.

These modifying agents may be used either singly or in any combination thereof. The amount of the modifying agent used is suitably selected according to the preparation process, preparation conditions or the like. The amount of the modifying agent used in the case where the linear diene polymer component is prepared separately is generally within a range of from 1 to 50 equivalents, preferably from 1 to 20 equivalents, more preferably from 1 to 10 equivalents to the active metal in the active diene polymer. In the case where the branched diene polymer component (A) and the linear diene polymer component (B) are prepared in a simultaneous or successive reaction, (1) when the modifying agent is allowed to react with the active diene polymer at the same time as the polyfunctional coupling agent or before the reaction with the polyfunctional coupling agent, the amount of the modifying agent used is generally within a range of from 0.1 to 0.9 equivalents, preferably from 0.2 to 0.8 equivalents, more preferably from 0.3 to 0.7 equivalents to the active metal in the active diene polymer. (2) When the modifying agent is allowed to react with the active diene polymer after the reaction with the polyfunctional coupling agent, the amount of the modifying agent used is generally within a range of from 0.1 to 50 equivalents, preferably from 0.2 to 20 equivalents, more preferably from 0.3 to 10 equivalents to the active metal in the active diene polymer. By the way, when the diene polymer is that polymerized using the active organometallic compound as an initiator, an amount of the modifying agent used "to the amount of the active organometallic compound used" is determined as the amount of the modifying agent used "to the active metal in the active diene polymer".

The modification reaction may be conducted by bringing the active diene polymer into contact with the modifying agent. In the case where the active diene polymer is prepared by a polymerization reaction making use of the active organometallic compound as an initiator, the modification reaction can be generally performed by adding the prescribed amount of the modifying agent to the reaction mixture containing the active diene polymer before termination of the polymerization. The reactions of the active diene polymer with the polyfunctional coupling agent and the modifying agent may be conducted at the same time or one after the other. However, a process wherein the active diene polymer is allowed to react with the polyfunctional coupling agent, and the remaining active diene polymer is then allowed to react with the modifying agent usually takes place. The reaction temperature and time in the modification reaction may be widely selected. However, the reaction is generally conducted at room temperature to 120° C. for several seconds to several hours. In general, the modification rate is suitably selected within a range of from 10 to 100%. The modification rate can be determined by measuring respective absorption intensities by a differential refractometer (RI) in GPC and a spectrophotometer (UV) for ultraviolet and visible region to find a ratio (UV/RI) of the respective intensities and comparing the value with a calibration curve prepared in advance.

No particular limitation is imposed on the alkylating agent for quaternizing the tertiary amino group introduced into the diene polymer chain so far as it is a quaternizing agent used in usual chemical reactions. Examples thereof include alkyl nitrates such as methyl nitrate, ethyl nitrate, propyl nitrate and butyl nitrate; potassium alkylsulfates such as potassium methylsulfate and potassium ethylsulfate; dialkyl sulfate such as dimethyl sulfate and diethyl sulfate; alkyl esters of arylsulfonic acids such as methyl arylsulfonates, ethyl arylsulfonates and propyl arylsulfonates; and alkyl halides. Of these, the alkyl halides are preferred, with alkyl monohalides being particularly preferred.

No particular limitation is imposed on the alkyl monohalide so far as it is a compound composed of a halogen atom and an alkyl group. The hydrogen atoms of the alkyl group thereof may by partially substituted by a substituent group such as an aryl, alkoxy or aryloxy group which does not hinder the quaternizing reaction. The halogen atom is preferably a chlorine, bromine or iodine atom, with the iodine atom being particularly preferred. Examples of the alkyl group include methyl, ethyl, propyl, isopropyl, n-butyl, sec-butyl, tert-butyl, n-pentyl, isopentyl, n-hexyl, n-octyl and n-dodecyl groups. Of these, lower alkyl groups having 1 to 6 carbon atoms, such as methyl, ethyl, propyl, isopropyl, n-butyl, sec-butyl, tert-butyl, n-pentyl, isopentyl and n-hexyl groups, are preferred. The methyl, ethyl, propyl and butyl groups are more preferred, with the methyl and ethyl groups being particularly preferred. Examples of the alkyl group the hydrogen atoms of which have been partially substituted by a substituent group which does not hinder the quaternizing reaction include benzyl, phenethyl, methoxyethyl, ethoxyethyl and phenoxyethyl groups.

Specific examples of the alkyl monohalide include aliphatic alkyl monohalides such as methyl chloride, methyl bromide, methyl iodide, ethyl chloride, ethyl bromide, ethyl iodide, propyl iodide, butyl iodide, butyl bromide and hexyl iodide; alicyclic alkyl monohalides such as cyclopentyl chloride, cyclopentyl iodide, cyclohexyl chloride, cyclohexyl bromide and cyclohexyl iodide; and aralkyl monohalides such as benzyl chloride, benzyl bromide and benzyl iodide. Of these, the aliphatic alkyl monohalides are preferred, with aliphatic lower alkyl monohalides being particularly preferred. Methyl monohalides are most preferred among the alkyl monohalides.

These alkylating agents may be used either singly or in any combination thereof. The amount of the alkylating agent used is suitably selected according to the degree of quaternization required. In the present invention, even a slight degree of quaternization can bring about a sufficient effect on heat build-up resistance, tensile strength and abrasion resistance. The amount of the alkylating agent used is generally selected within a range of from 0.1 to 50 equivalents, preferably from 0.2 to 20 equivalents, more preferably from 0.3 to 10 equivalents to the total content of the tertiary amino group in the diene polymer chain.

No particular limitation is imposed on the reaction with the alkylating agent, and the reaction may be conducted in accordance with a method known per se in the art. In the case where the active diene polymer is prepared by a polymerization reaction making use of the active organometallic compound as an initiator, the quaternizing reaction may be performed by adding the prescribed amount of the alkylating agent to the reaction mixture after the active diene polymer is allowed to react with the polyfunctional coupling agent and the modifying agent. The reaction is generally conducted at 0 to 90° C., preferably 20 to 80° C. for 0.1 to 10 hours, preferably 0.5 to 5 hours.

The identification of quaternization after completion of the reaction may be conducted in accordance with a method known per se in the art, for example, by means of ultraviolet (UV) absorption spectrum or the qualitative reaction of quinhydrone.

Rubber Component:

The rubber composition according to the present invention comprises, as a rubber component, the above-described diene polymer composition composed of the branched diene polymer component (A) and the linear diene polymer component (B) as an essential component. Another rubber component may be blended if desired. A proportion of the diene polymer composition in the rubber component is suitably selected as necessary for the end application intended. However, the diene polymer composition is generally used in a proportion of at least 10 wt. %, preferably within a range of from 15 to 100 wt. %, more preferably from 20 to 100 wt. %, most preferably from 25 to 100 wt. %. If the proportion of the diene polymer composition according to the present invention in the rubber component is too low, its improving effect on heat build-up resistance, tensile strength, abrasion resistance and processability becomes insufficient. It is hence not preferable to use the diene polymer composition in such a low proportion. A proportion of the component (A) to the component (B) (weight ratio of A:B) in the diene polymer composition is generally within a range of from 90:10 to 10:90, preferably from 80:20 to 20:80, more preferably from 70:30 to 30:70.

No particular limitation is imposed on another rubber usable in combination. However, diene rubbers other than the components (A) and (B) may be usually used. Examples thereof include natural rubber (NR), polyisoprene rubber (IR), emulsion-polymerized styrene-butadiene copolymer rubber (SBR), solution-polymerized random SBR (bound styrene: 5 to 50 wt. %; 1,2-bond content of butadiene bond unit portion: 10 to 80%), high-trans SBR (1,4-trans bond content of butadiene bond unit portion: 70 to 95%), low-cis polybutadiene rubber (BR), high-cis BR, high-trans BR (1,4-trans bond content of butadiene bond unit portion: 70 to 95%), styrene-isoprene copolymer rubber (SIR), butadieneisoprene copolymer rubber, solution-polymerized random styrene-butadiene-isoprene terpolymer rubber (SIBR), emulsion-polymerized SIBR, emulsion-polymerized styrene-acrylonitrile-butadiene terpolymer rubber, acrylonitrile-butadiene copolymer rubber, high-vinyl SBR-low-vinyl SBR block copolymer rubber, and block copolymers such as polystyrene-polybutadiene-polystyrene block copolymers. As said another diene rubber, may be used tertiary amino group-containing diene rubber, specifically, a diene polymer obtained by introducing a tertiary amino group into the above-described active diene polymer by reaction with a modifying agent. Among these, NR, BR, IR, SBR, SIBR and the tertiary amino group-containing diene rubber are preferred.

These diene rubber components may be used either singly or in any combination thereof.

Reinforcing Agent:

No particular limitation is imposed on a reinforcing agent. For example, silica, carbon black and the like may be used.

No particular limitation is imposed on the silica. However, examples thereof include dry process white carbon, wet process white carbon, colloidal silica and precipitated silica disclosed in Japanese Patent Application Laid-Open No. 62838/1987. Of these, wet process white carbon comprising hydrous silicic acid as a main component is particularly preferred. These kinds of silica may be used either singly or in any combination thereof.

No particular limitation is imposed on the specific surface area of the silica. However, it is preferred that the specific surface area should be generally within a range of from 50 to 400 $m^2/g$, preferably from 100 to 220 $m^2/g$, more preferably from 120 to 190 $m^2/g$ in terms of a specific surface area determined by nitrogen absorption (BET method), because improvements of reinforcing ability, abrasion resistance and heat build-up resistance are sufficiently achieved. The specific surface area determined by nitrogen absorption as used herein is a value determined by the BET method in accordance with ASTM D 3037-81.

No particular limitation is imposed on the carbon black used. However, examples thereof include furnace black, acetylene black, thermal black, channel black and graphite. Of these, furnace black is particularly preferred. Specific examples thereof include various grades of carbon black, such as SAF, ISAF, ISAF-HS, ISAF-LS, IISAF-HS, HAF, HAF-HS, HAF-LS and FEF. These kinds of carbon black may be used either singly or in any combination thereof.

No particular limitation is imposed on the specific surface area ($N_2SA$) of the carbon black determined by nitrogen absorption. However, it is preferred that the specific surface area should be generally within a range of from 5 to 200 m$^2$/g, preferably from 50 to 150 m$^2$/g, more preferably from 80 to 130 m$^2$/g, because improvements of tensile strength and abrasion resistance are achieved at a high level. No particular limitation is imposed on the DBP absorption of the carbon black. However, it is preferred that the DBP absorption should be generally within a range of from 5 to 300 ml/100 g, preferably from 50 to 200 ml/100 g, more preferably from 80 to 160 ml/100 g, because improvements of tensile strength and abrasion resistance are achieved at a high level.

When high structure carbon black disclosed in Japanese Patent Application Laid-Open No. 230290/1993, wherein the specific surface area determined by absorption of cetyltrimethylammonium bromide (CTAB) is 110 to 170 m$^2$/g, and the DBP oil absorption (24M4DBP) after compressed repeatedly 4 times under a pressure of 24,000 psi is 110 to 130 ml/100 g, is used, the abrasion resistance of the resulting rubber composition can be more improved.

The compounding proportion of the reinforcing agent is generally 10 to 200 parts by weight, preferably 20 to 150 parts by weight, more preferably 30 to 120 parts by weight, per 100 parts by weight of the rubber component.

In order to achieve the objects of the present invention at a high level, it is preferred to use, as a reinforcing agent, silica by itself, or silica and carbon black in combination. In the case where silica and carbon black are used in combination, the compounding proportions thereof are suitably selected as necessary for the end application intended. However, they are generally used at the weight ratio of silica to carbon black of 10:90 to 99:1, preferably 30:70 to 95:5, more preferably 50:50 to 90:10.

Silane Coupling Agent:

When the rubber composition according to the present invention contains silica as a reinforcing agent, it is preferred to add a silane coupling agent to the rubber composition, because the heat build-up resistance and abrasion resistance thereof are further improved.

No particular limitation is imposed on the silane coupling agent. However, examples thereof include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl) tetrasulfide, and tetrasulfides described in Japanese Patent Application Laid-Open No. 248116/1994, such as γ-trimethoxysilylpropyldimethylthiocarbamyl tetrasulfide and γ-trimethoxysilylpropylbenzothiazyl tetrasulfide.

These silane coupling agents may be used either singly or in any combination thereof. The compounding proportion of the silane coupling agent is generally within a range of from 0.1 to 30 parts by weight, preferably from 1 to 20 parts by weight, more preferably from 2 to 10 parts by weight, per 100 parts by weight of the silica.

Rubber Composition:

In addition to the above-described components, the rubber compositions according to the present invention may contain necessary amounts of other compounding agents such as vulcanizing agents, vulcanization accelerators, vulcanization activators, antioxidants, activators, plasticizers, lubricants and fillers in accordance with a method known per se in the art.

No particular limitation is imposed on the vulcanizing agents. However, examples thereof include various kinds of sulfur, such as sulfur powder, precipitated sulfur, colloidal sulfur, insoluble sulfur and high-dispersible sulfur; sulfur halides such as sulfur monochloride and sulfur dichloride; organic peroxides such as dicumyl peroxide and tert-butyl peroxide; quinone dioximes such as p-quinone dioxime and p,p'-dibenzoylquinone dioxime; organic polyamines such as triethylenetetramine, hexamethylenediamine carbamate and 4,4'-methylenebis-o-chloroaniline; and alkylphenol resins having a methylol group. Of these, sulfur is preferred, with sulfur powder being particularly preferred. These vulcanizing agents may be used either singly or in any combination thereof.

The compounding proportion of the vulcanizing agent is generally within a range of from 0.1 to 15 parts by weight, preferably from 0.3 to 10 parts by weight, more preferably from 0.5 to 5 parts by weight, per 100 parts by weight of the rubber component. The compounding proportion of the vulcanizing agent within this range is preferred because the resulting rubber composition becomes excellent in tensile strength and abrasion resistance and also in properties such as heat build-up resistance and residual strain.

Examples of the vulcanization accelerators include sulfenamide type vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; guanidine type vulcanization accelerators such as diphenylguanidine, di-o-tolylguanidine and o-tolylbiguanidine; thiourea type vulcanization accelerators such as thiocarboanilide, di-o-tolylthiourea, ethylenethiourea, diethylenethiourea and trimethylenethiourea; thiazole type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid type vulcanization accelerators such as sodium dimethyl-dithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, selenium dimethyldithiocarbamate, selenium diethyldithiocarbamate, copper dimethyl-dithiocarbamate, iron dimethyldithiocarbamate, diethylamine diethyldithiocarbamate, piperidine pentamethylene dithiocarbamate and pipecoline pentamethylene dithiocarbamate; and xanthogenic acid type vulcanization accelerators such as sodium isopropyl-xanthogenate and zinc butylxanthogenate.

These vulcanization accelerators may be used either singly or in any combination thereof. However, it is particularly preferred that the vulcanization accelerator comprises a sulfenamide type vulcanization accelerator. The compounding proportion of the vulcanization accelerator is generally within a range of from 0.1 to 15 parts by weight, preferably from 0.3 to 10 parts by weight, more preferably from 0.5 to 5 parts by weight, per 100 parts by weight of the rubber component.

No particular limitation is imposed on the vulcanization activators. However, for example, higher fatty acids such as stearic acid, zinc oxide, and the like may be used. As the zinc oxide, zinc oxide of high surface activity having a particle size of at most 5 μm is preferably used. As specific examples of such zinc oxide, may be mentioned active zinc white having a particle size of 0.05 to 0.2 μm and zinc white having a particle size of 0.3 to 1 μm. The zinc oxide may be surface-treated with an amine-type dispersing agent or wetting agent before use.

These vulcanization activators may be used either singly or in any combination thereof. The compounding proportion of the vulcanization activator is suitably selected according to the kind of the vulcanization activator used. In the case where a higher fatty acid is used, it is generally within a range of from 0.05 to 15 parts by weight, preferably from 0.1 to 10 parts by weight, more preferably from 0.5 to 5 parts by weight, per 100 parts by weight of the rubber component. In the case where zinc oxide is used, it is generally within a range of from 0.05 to 10 parts by weight, preferably from 0.1 to 5 parts by weight, more preferably from 0.5 to 2 parts by weight, per 100 parts by weight of the rubber component. When the compounding proportion of the zinc oxide falls within this range, the resulting rubber composition is balanced among properties such as processability, tensile strength and abrasion resistance, at a high level. Therefore, the compounding proportion within such a range is preferred.

Examples of other compounding agents include activators such as diethylene glycol, polyethylene glycol and silicone oil; fillers such as calcium carbonate, talc and clay; and process oil and waxes.

The rubber compositions according to the present invention can be obtained by kneading the individual components in a method known per se in the art. For example, the compounding agents except for the vulcanizing agent and vulcanization accelerator, and the rubber component are mixed, and the vulcanizing agent and vulcanization accelerator are then mixed, whereby a rubber composition can be obtained. The temperature at which the compounding agents except for the vulcanizing agent and vulcanization accelerator, and the rubber component are mixed is generally 80 to 200° C., preferably 100 to 190° C., more preferably 140 to 180° C. The mixing is generally conducted for at least 30 seconds, preferably 1 to 30 minutes. The vulcanizing agent and vulcanization accelerator are mixed after cooling down to generally 100° C. or lower, preferably room temperature to 80° C. Thereafter, the mixture is press-vulcanized at a temperature of generally 120 to 200° C., preferably 140 to 180° C., whereby the rubber composition according to the present invention can be obtained.

EXAMPLES

The present invention will hereinafter be described more specifically by the following Preparation Examples, Examples and Comparative Examples. All designations of "part" or "parts" and "%" as will be used in these examples mean part or parts by weight and wt. % unless expressly noted.

Various physical properties were determined in accordance with the following respective methods:

(1) The bound styrene content in each polymer was determined in accordance with JIS K 6383 (refractive index method).
(2) The vinyl bond content in the butadiene bond units in each polymer was determined in accordance with an infrared spectroscopy (Hampton method).
(3) The identification of quaternization was conducted by means of an UV absorption spectrum at 480 nm.
(4) The weight average molecular weight (Mw) and number average molecular weight (Mn) of each polymer were determined by GPC to find its weight average molecular weight and number average molecular weight in terms of standard polystyrene.
(5) The styrene chain distribution in each copolymer was determined in accordance with the method described in "Preprints" by The Society of Polymer Science, Japan, Vol. 29, No. 9, p. 2055. Namely, the copolymer was subjected to ozone degradation and then to GPC measurement, thereby calculating proportions of a simple chain (S1) of one styrene unit and long chains (S8) composed of at least 8 styrene units.
(6) The tensile strength of each test sample was determined by measuring its breaking strength (Kgf/cm$^2$) in accordance with JIS K 6301. This property was expressed in terms of an index (tensile strength index). The higher index indicates better tensile strength.
(7) The heat build-up of each test sample was determined by measuring tan δ at 1% torsion, 20 Hz and 60° C. by means of an RDA-II manufactured by Rheometrics Co. This property was expressed in terms of an index (heat build-up index). The higher index indicates lower heat build-up and is preferred.
(8) The abrasion resistance of each test sample was determined by means of a Pico abrasion tester in accordance with ASTM D 2228. This property is expressed in terms of an index (abrasion resistance index). The higher index indicates better abrasion resistance and is preferred.
(9) The processability of each rubber composition was determined by observing winding tendency of the composition on a roll, and evaluated in accordance with the following standard:

5: Wound closely;

4: Wound, but slightly rose to the surface of the roll;

3: Wound, but rose by about half to the surface of the roll;

2: Wound, but frequently rose to the surface of the roll;

1: Scarcely wound.

Example 1

After an autoclave equipped with a stirrer was charged with 8,000 g of cyclohexane, 310 g of styrene, 600 g of butadiene and 36 mmol of tetramethylethylenediamine (TMEDA), 12 mmol of n-butyllithium were added to initiate polymerization at 40° C. After 10 minutes from the initiation of polymerization, 1,090 g of residual butadiene were continuously added. After it was identified that the conversion of the monomers into a polymer had reached 100%, 0.15 mmol of stannic chloride (SnCl$_4$) were added to conduct a reaction for 20 minutes, and 10 mmol of N,N-dimethylaminopropyl acrylamide (DMAP) were then added to conduct a reaction for additional 30 minutes. To the reaction mixture, were then added 2 mmol of methyl iodide to conduct a reaction for 20 minutes. After completion of the reaction, 20 mmol of methanol as a terminator were added, and 20 g of 2,6-di-tert-butylphenol were then added. Thereafter, a polymer formed was recovered by steam stripping to obtain a diene polymer composition (Diene Rubber No. 1). The properties of the diene polymer composition were determined, and the results thereof are shown in Table 1.

Examples 2 to 4 and Comparative Example 1 to 4

Diene polymer compositions or diene polymers (Diene Rubber Nos. 2 to 8) were obtained in the same manner as in Example 1 except for their corresponding polymerization conditions shown in Table 1. The properties thereof are shown in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Diene Rubber No. | 1 | 2 | 3 | 4 | 5 | 6 | 7 | 8 |
| Polymerization conditions | | | | | | | | |
| Charged amount of styrene (g) | 310 | 460 | 460 | 400 | 400 | 460 | 400 | 400 |
| Charged amount of butadiene (g) | 600 | 700 | 700 | 800 | 800 | 700 | 800 | 800 |
| Amount of butadiene subsequently added (g) | 1090 | 840 | 840 | 800 | 800 | 840 | 800 | 800 |
| Temperature, min (° C.) | 40 | 50 | 50 | 40 | 40 | 50 | 40 | 50 |
| Temperature, max (° C.) | 60 | 70 | 70 | 60 | 60 | 70 | 60 | 80 |
| Amount of n-butyllithium added (mmol) | 12 | 11 | 11 | 10 | 14 | 11 | 10 | 10 |
| TMEDA (mmol) | 36 | 3.5 | 3.5 | 10 | 20 | 3.5 | 3.5 | 10 |
| Amount of butadiene added (g) | 5 | 10 | 10 | 10 | 10 | 10 | 10 | — |
| $SnCl_4$ (mmol) (*1) | 0.15 | — | 0.15 | 0.15 | 3.5 | — | 0.15 | — |
| TMS (mmol) (*2) | — | 0.15 | — | — | — | — | — | — |
| Kind of modifier (*3) | DMAP | AST | EAB | EAB | — | DMAP | EAB | — |
| Modifier (mmol) | 10 | 4 | 4 | 4 | — | 10 | 4 | — |
| Methyl iodide (mmol) | 2 | — | 4 | 8 | — | 11 | — | — |
| Butyl iodide (mmol) | — | 4 | — | — | — | — | — | — |
| Properties of polymer: | | | | | | | | |
| Bound styrene content (wt. %) | 15.6 | 22.9 | 22.1 | 20.8 | 20.2 | 22.1 | 20.9 | 20.5 |
| 1,2-Vinyl content (%) | 71.0 | 33.1 | 34.2 | 63.1 | 64.5 | 34.2 | 35.3 | 64.1 |
| S1 (%) (*4) | 89.1 | 89.9 | 88.4 | 83.0 | 89.2 | 88.4 | 83.5 | 85.1 |
| S8 ≥ (*5) | 0.3 | 0.2 | 0.3 | 0.1 | 0.1 | 0.3 | 0.3 | 0.2 |
| Mw (× $10^4$) | 62.2 | 59.9 | 63.4 | 65.1 | 68.3 | 31.5 | 62.6 | 30.1 |
| Mw/Mn | 1.91 | 1.81 | 1.76 | 1.77 | 1.42 | 1.36 | 1.78 | 1.18 |

Note:
(*1) Tin tetrachloride

Examples 5 to 8 and Comparative Examples 5 and 6

Diene rubbers of Diene Rubber Nos. 5 and 6 prepared in Preparation Examples (Examples 1 to 4 and Comparative Examples 1 to 4) were used separately or together as raw rubber. On the basis of the formulation shown in Table 2, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were added to knead the mixture for 2 minutes at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 3.

TABLE 2

| Formulation 1 | First | Second | Third |
| --- | --- | --- | --- |
| Raw rubber | Whole | — | — |
| Silica (*1) | 25 | 25 | — |
| Silane coupling agent (*2) | 1.5 | 1.5 | — |
| Diethylene glycol | — | 2 | — |
| Stearic acid | — | 2.5 | — |
| Zinc oxide | — | 1 | — |
| Aromatic oil | — | 5 | — |
| Wax | — | 5 | — |
| Antioxidant (*3) | — | 2 | — |
| Sulfur | — | — | 1.4 |
| Vulcanization accelerator (*4) | — | — | 2.5 |

Note:
(*1) Ultrasil VN3 (specific surface area measured by nitrogen absorption: 175 $m^2$/g; product of Degussa AG)
(*2) Si69 (product of Degussa AG)
(*3) Nocrac 6C (product of Ouchi-Shinko Chemical Industrial Co., Ltd.)
(*4) Nocceler CZ (product of Ouchi-Shinko Chemical Industrial Co., Ltd.)

TABLE 3

|  | Comp. Ex. | Example | | | | Comp. Ex. |
| --- | --- | --- | --- | --- | --- | --- |
|  | 5 | 5 | 6 | 7 | 8 | 6 |
| Rubber component (parts) | | | | | | |
| Diene Rubber No. 5 | 100 | 70 | 50 | 30 | 10 | — |
| Diene Rubber No. 6 | — | 30 | 50 | 70 | 90 | 100 |
| Tensile strength index (*1) | 107 | 123 | 140 | 115 | 101 | 100 |
| Heat build-up index (*1) | 85 | 110 | 130 | 120 | 104 | 100 |
| Abrasion resistance index (*1) | 75 | 110 | 125 | 119 | 102 | 100 |
| Processability | 4 | 5 | 5 | 5 | 2 | 1 |

Note:
(*1) Expressed in terms of an index assuming that the value of Comparative Example 6 is 100.

As apparent from the results shown in Table 3, it is understood that the rubber compositions (Examples 5 to 8)

making use of the respective diene polymer compositions according to the present invention, which were obtained by separately preparing a branched diene polymer component (A) and a linear diene polymer component (B) and mixing them with each other, are improved more fully in all properties of tensile strength, heat build-up resistance, abrasion resistance and processability than the rubber compositions (Comparative Examples 5 and 6) making separate use of the diene polymer components.

Example 9 and Comparative Example 7

Diene rubbers of Diene Rubber Nos. 4 and 8 prepared in Preparation Examples were separately used as raw rubber. On the basis of Formulation 2 shown in Table 4, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were added to knead the mixture for 2 minutes at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 5.

TABLE 4

| Formulation 2 | First | Second | Third |
| --- | --- | --- | --- |
| Raw rubber | Whole | — | — |
| Silica (*1) | 30 | 30 | — |
| Silane coupling agent (*2) | 2 | 2 | — |
| Diethylene glycol | — | 2 | — |
| Stearic acid | — | 2.5 | — |
| Zinc oxide | — | 1 | — |
| Aromatic oil | — | 10 | — |
| Wax | — | 5 | — |
| Antioxidant (*3) | — | 2 | — |
| Sulfur | — | — | 1.5 |
| Vulcanization accelerator (*4) | — | — | 2 |

Note:
(*1) Z1165MP (specific surface area determined by nitrogen absorption = 175 m²/g; product of Rhone-Poulenc S.A.)
(*2) Si69
(*3) Nocrac 6C
(*4) Nocceler CZ

TABLE 5

| | Example 9 | Comp. Example 7 |
| --- | --- | --- |
| Rubber component (parts) | | |
| Diene Rubber No. 4 | 100 | — |
| Diene Rubber No. 8 | — | 100 |
| Tensile strength index (*1) | 130 | 100 |
| Heat build-up index (*1) | 120 | 100 |
| Abrasion resistance index (*1) | 121 | 100 |
| Processability | 5 | 2 |

Note:
(*1) Expressed in terms of an index assuming that the value of Comparative Example 7 is 100.

As apparent from the results shown in Table 5, it is understood that the rubber composition (Example 9) making use of the diene polymer composition according to the present invention obtained by preparing a branched diene polymer component (A) and a linear diene polymer component (B) in the successive reaction is fully improved in all properties of tensile strength, heat build-up resistance, abrasion resistance and processability.

Examples 10 to 13 and Comparative Examples 8 and 9

Diene rubbers of Diene Rubber Nos. 1 to 4, and Nos. 6 and 7 prepared in Preparation Examples were separately used as raw rubber. On the basis of Formulation 3 shown in Table 6, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were added to knead the mixture for 2 minutes at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 7.

TABLE 6

| Formulation 3 | First | Second | Third |
| --- | --- | --- | --- |
| Raw rubber | Whole | — | — |
| Silica (*1) | 35 | 35 | — |
| Silane coupling agent (*2) | 2.5 | 2.5 | — |
| Diethylene glycol | — | 3 | — |
| Stearic acid | — | 2.5 | — |
| Zinc oxide | — | 1.5 | — |
| Aromatic oil | — | 20 | — |
| Wax | — | 5 | — |
| Antioxidant (*3) | — | 2 | — |
| Sulfur | — | — | 1.5 |
| Vulcanization accelerator (*4) | — | — | 3 |

Note:
(*1) Z1165MP
(*2) Si69
(*3) Nocrac 6C
(*4) Nocceler CZ

TABLE 7

| | Example | | | | Comp. Ex. | |
| --- | --- | --- | --- | --- | --- | --- |
| | 10 | 11 | 12 | 13 | 8 | 9 |
| Rubber component (parts) | | | | | | |
| Diene Rubber No. 1 | 100 | — | — | — | — | — |
| Diene Rubber No. 2 | — | 100 | — | — | — | — |
| Diene Rubber No. 3 | — | — | 100 | — | — | — |
| Diene Rubber No. 4 | — | — | — | 100 | — | — |
| Diene Rubber No. 6 | — | — | — | — | 100 | — |
| Diene Rubber No. 7 | — | — | — | — | — | 100 |
| Tensile strength index (*1) | 138 | 123 | 133 | 143 | 100 | 110 |
| Heat build-up index (*1) | 108 | 110 | 130 | 125 | 100 | 115 |
| Abrasion resistance index (*1) | 115 | 110 | 125 | 119 | 100 | 120 |
| Processability | 5 | 4 | 4 | 5 | 1 | 3 |

Note:
(*1) Expressed in terms of an index assuming that the value of Comparative Example 8 is 100.

As apparent from the results shown in Table 7, it is understood that the rubber compositions (Examples 11 and 13) containing the respective diene polymer compositions according to the present invention obtained by allowing the alkylating agent (1 equivalent to the content of the tertiary amino group) sufficient to quaternize the whole tertiary amino group to react are fully improved in all properties of tensile strength, heat build-up resistance, abrasion resistance and processability, and that greater improvements are brought about when a comparatively lower alkylating agent is used as the alkylating agent. It is also understood that even when the diene polymer compositions according to the present invention obtained by quaternizing with methyl iodide in an amount of 0.5 equivalents to the content of the tertiary amino group (Examples 10 and 12), the resulting rubber compositions are improved fully in all properties of tensile strength, heat build-up resistance, abrasion resistance and processability. On the other hand, it is understood that when the diene polymer composition containing a linear diene polymer component not subjected to quaternization is used, the resulting rubber composition is not fully improved in all properties of tensile strength, heat build-up resistance, abrasion resistance and processability (compare Example 12 with Comparative Example 9).

Examples 14 to 16 and Comparative Example 10

A diene rubber of Diene Rubber No. 4 or 8 prepared in Preparation Example, and a commercially available diene rubber shown in Table 9 were used as raw rubber. On the basis of Formulation 4 shown in Table 8, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were added to knead the mixture for 3 minutes at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 9.

TABLE 8

| Formulation 4 | First | Second | Third |
|---|---|---|---|
| Raw rubber | Whole | — | — |
| Silica (*1) | 30 | 30 | — |
| Carbon black (*2) | — | 20 | — |
| Silane coupling agent (*3) | 1.5 | 1.5 | — |
| Diethylene glycol | — | 2 | — |
| Stearic acid | — | 2.5 | — |
| Zinc oxide | — | 1.5 | — |
| Aromatic oil | — | 25 | — |
| Wax | — | 5 | — |
| Antioxidant (*4) | — | 2 | — |
| Sulfur | — | — | 1.5 |
| Vulcanization accelerator (*5) | — | — | 2.5 |

Note:
(*1) Z1165MP
(*2) Seast KH (product of Tokai Carbon Co., Ltd.)
(*3) Si69
(*4) Nocrac 6C
(*5) Nocceler CZ

TABLE 9

|  | Example | | | Comp. Ex. |
|---|---|---|---|---|
|  | 14 | 15 | 16 | 10 |
| Rubber component (parts) | | | | |
| Diene Rubber No. 4 | 75 | 60 | 40 | — |
| Diene Rubber No. 8 | — | — | — | 75 |
| BR1220 (*1) | 25 | — | — | 25 |
| IR2220 (*2) | — | 40 | 60 | — |
| Tensile strength index (*3) | 110 | 140 | 150 | 100 |

TABLE 9-continued

|  | Example | | | Comp. Ex. |
|---|---|---|---|---|
|  | 14 | 15 | 16 | 10 |
| Heat build-up index (*3) | 115 | 125 | 112 | 100 |
| Abrasion resistance index (*3) | 110 | 130 | 122 | 100 |
| Processability | 4 | 5 | 5 | 3 |

Note:
(*1) Polybutadiene (product of Nippon Zeon Co., Ltd.)
(*2) Polyisoprene rubber (product of Nippon Zeon Co., Ltd.)
(*3) Expressed in terms of an index assuming that the value of Comparative Example 10 is 100.

As apparent from the results shown in Table 9, it is understood that the diene polymer compositions according to the present invention are improved in all properties of tensile strength, heat build-up resistance and abrasion resistance even when silica and carbon black are used in combination as a reinforcing agent (Examples 14 to 16). It is also understood that even when the diene polymer composition according to the present invention is used in combination with another diene rubber, highly improving effects are developed, and that the combined use of the diene polymer composition with another diene rubber results in rubber compositions better balanced among the respective properties (Examples 14 to 16).

INDUSTRIAL APPLICABILITY

According to the present invention, there are provided rubber compositions in which tensile strength and abrasion resistance, which have hitherto been weak points of silica-compounded rubber materials, can be highly improved without impairing excellent heat build-up resistance (rolling resistance) which constitutes a feature of such rubber materials, and which have excellent processability. Therefore, the diene polymer compositions and rubber compositions according to the present invention can be used in various fields of applications, for example, various parts for tires, such as treads, carcasses, sidewalls and beads; rubber products such as hoses, window frames, belts, shoe soles, rubber vibration insulators and automobile parts; and further toughening rubbers for resins such as impact-resistant polystyrene and ABS resins, making good use of their excellent properties. Although the rubber compositions according to the present invention are suitable for use in, particularly, tire treads of fuel consumption-reducing tires making good use of their excellent properties, they are also suitable for use in tire treads, sidewalls, under treads, carcasses, beads and the like of all-season tires, high performance tires, studless tires, etc.

What is claimed is:

1. A diene polymer composition composed of a branched diene polymer component (A) having at least three branched diene polymer chains through a polyfunctional coupling agent and a linear diene polymer component (B) having a quaternary ammonium group, and having a weight average molecular weight (Mw) within a range of from 100,000 to 2,000,000.

2. The diene polymer composition according to claim 1, wherein the branched diene polymer component (A) is obtained by allowing an active diene polymer with an active metal bonded to its molecular chain to react with a coupling agent which is trifunctional or polyfunctional to a degree higher than three.

3. The diene polymer composition according to claim 1, wherein the linear diene polymer component (B) having a quaternary ammonium group is obtained by allowing an active diene polymer with an active metal bonded to its molecular chain to react with a modifying agent capable of introducing a tertiary amino group into the polymer chain by reacting with the active metal, and then allowing an alkylating agent to react to convert the tertiary amino group into a quaternary ammonium group.

4. The diene polymer composition according to claim 1, wherein the weight ratio (A:B) of the branched diene polymer component (A) to the linear diene polymer component (B) falls within a range of from 10:90 to 90:10.

5. The diene polymer composition according to claim 1, wherein the molecular weight distribution (Mw/Mn) falls within a range of from 1.1 to 3.5.

6. The diene polymer composition according to claim 1, wherein the vinyl bond content in conjugated diene bond portions is at least 10%.

7. The diene polymer composition according to claim 1, wherein the branched diene polymer component (A) and the linear diene polymer component (B) are both derived from a diene polymer obtained by (co)polymerizing 40 to 100 wt. % of a conjugated diene and 60 to 0 wt. % of another monomer which is copolymerizable with the conjugated diene.

8. The diene polymer composition according to claim 7, wherein said other monomer is an aromatic vinyl.

9. A process for producing a diene polymer composition having a weight average molecular weight (Mw) within a range of from 100,000 to 2,000,000, the process comprising (1) allowing an active diene polymer with an active metal bonded to its molecular chain to react with a coupling agent which is trifunctional or polyfunctional to a degree higher than three and a modifying agent capable of introducing a tertiary amino group into the polymer chain by reacting with the active metal to form a branched diene polymer component (A) having at least three branched diene polymer chains through the coupling agent and a linear diene polymer component with the tertiary amino group introduced therein, and then (2) allowing an alkylating agent to react with the linear diene polymer component to convert the tertiary amino group into a quaternary ammonium group, thereby forming a linear diene polymer component (B) having the quaternary ammonium group.

10. The process according to claim 9, wherein in the step (1), the active diene polymer is first allowed to react with the coupling agent to form the branched diene polymer component (A), and the remaining active diene polymer is then allowed to react with the modifying agent to form the linear diene polymer component with the tertiary amino group introduced therein.

11. The process according to claim 9, wherein the active diene polymer is a polymer with the active metal bonded to a terminal of the polymer chain thereof.

12. The process according to claim 9, wherein the active diene polymer is a diene polymer with the active metal bonded to the terminal of its polymer chain, which is obtained by (co)polymerizing 40 to 100 wt. % of a conjugated diene and 60 to 0 wt. % of another copolymerizable monomer using an active organometallic compound containing the active metal as an initiator.

13. The process according to claim 12, wherein the amount of the active organometallic compound used is 0.01 to 20 millimoles per 100 g of the whole monomer used.

14. The process according to claim 12, wherein the (co)polymerization is conducted in the presence of a polar compound.

15. The process according to claim 14, wherein the amount of the polar compound used is within a range of from 0.01 to 100 moles per mole of the active organometallic compound.

16. The process according to claim 9, wherein the amount of the coupling agent used is 0.1 to 0.9 equivalents to the active metal in the active diene polymer.

17. The process according to claim 9, wherein the amount of the modifying agent used is 0.1 to 50 equivalents to the active metal in the active diene polymer.

18. The process according to claim 9, wherein the amount of the alkylating agent used is 0.1 to 50 equivalents to the total content of the tertiary amino group introduced into the diene polymer.

19. A rubber composition comprising a rubber component containing a diene polymer composition which is composed of a branched diene polymer component (A) having at least three branched diene polymer chains through a polyfunctional coupling agent and a linear diene polymer component (B) having a quaternary ammonium group, and has a weight average molecular weight (Mw) within a range of from 100,000 to 2,000,000, and a reinforcing agent.

20. The rubber composition according to claim 19, wherein the reinforcing agent is compounded in a proportion of 10 to 200 parts by weight per 100 parts by weight of the rubber component.

* * * * *